United States Patent [19]

Michaelis

[11] Patent Number: 5,407,167
[45] Date of Patent: Apr. 18, 1995

[54] DOCUMENT SUPPORT AND METHOD OF USING SAME

[76] Inventor: Siegfried A. Michaelis, 5425 Shadowwood Dr., Virginia Beach, Va. 23455

[21] Appl. No.: 177,954
[22] Filed: Jan. 6, 1994
[51] Int. Cl.⁶ ............................................. A47B 19/00
[52] U.S. Cl. .................................. 248/441.1; 24/300; 224/275
[58] Field of Search ................. 248/441.1, 452, 448, 248/231, 905, 902; 297/191; 224/275, 277; 24/300, 67.11, 67 R

[56] References Cited

U.S. PATENT DOCUMENTS

| | | | |
|---|---|---|---|
| 2,634,470 | 4/1953 | De Grafft, Jr. | 24/3 |
| 3,555,622 | 1/1971 | Christian | 24/67 R |
| 3,727,272 | 4/1973 | Rhodes | 24/81 T |
| 4,466,659 | 8/1984 | Carpentier et al. | 297/191 |
| 4,681,366 | 7/1987 | Lobanoff | 297/191 |
| 4,739,541 | 4/1988 | Pitts | 24/67.11 X |
| 5,050,790 | 10/1991 | LaVelle | 224/275 |
| 5,172,881 | 12/1992 | Stein | 248/231 |
| 5,226,576 | 7/1993 | Ellsworth | 224/275 X |

Primary Examiner—Ramon O. Ramirez
Attorney, Agent, or Firm—Griffin, Butler, Whisenhunt & Kurtossy

[57] ABSTRACT

A document support (10) comprises an elastic cord (12) arranged in the shape of an endless loop (11), two elongated, tubular, high-friction spreaders (14a and b) through which the endless loop slidably extends, and a plurality of squeeze-type spring clips (16, 18) slidably and rotatably mounted on the endless loop. The document support is used by elastically expanding the endless loop, placing the high-friction spreaders on opposite edges (42) of an object (such as a seat back (38)) with the endless loop surrounding the stationary object and the spring clips positioned on a working side (47) of the stationary object, and allowing the elastic cord of the endless loop to elastically contract onto the stationary object. Documents are selectively attached to the squeeze-type spring clips by a person positioned on the working side of the stationary object.

14 Claims, 2 Drawing Sheets

DOCUMENT SUPPORT AND METHOD OF USING SAME

BACKGROUND OF THE INVENTION

This invention relates generally to devices for supporting documents and other objects, and more particularly to such devices which are suited for mounting documents on back sides of airplane seat backs so that passengers working in airplanes can conveniently display documents.

A number of devices have been suggested for holding objects to the backs of seats, as well as to other objects. Examples of these are provided in U.S. Pat. No. 2,634,470 to de Grafft; U.S. Pat. No. 4,466,659 to Carpentier et al.; U.S. Pat. No. 4,681,366 to Lobanoff; and U.S. Pat. No. 3,727,272 to Rhodes. However, devices suggested in the prior art have not been totally suitable for passengers performing "paperwork" in airplanes. In this respect, when passengers perform "paperwork" in airplanes, it is often helpful for them to support various-size sheets of paper so that they can view them while working with lap-top computers. Normally, such a person working in an airplane must support everything on his lap, which is impractical, since he is often working in his lap. Thus, it is an object of this invention to provide a document support, and a method of using the same, which allows a person performing "paperwork" in an airplane to display various-size sheets of paper away from his lap.

Although some such devices have been suggested for attaching sheets of paper to seat backs, such devices have not been satisfactory. To properly function in this capacity, a document support must be foldable to a small size so that it can be easily stored and transported by a user when it is not deployed. Similarly, such a document support cannot disturb the person in a seat of a seat back on which the document support is mounted. Further, such a document support must accommodate various sizes and shapes of seat backs. Still further, such a document support must not damage the seat back on which it is mounted and it must allow a user to position sheets of paper supported thereby in various ways.

It is an object of this invention to provide a document support for supporting documents on a rear side of a seat back in an airplane which meets the requirements set forth above.

Still further, it is an object of this invention to provide such a document support which is inexpensive to construct yet which is highly effective in use.

Still further, it is an object of this invention to provide a method of supporting documents on a rear side of a seat back in an airplane which is uncomplicated and effective.

SUMMARY

According to principles of this invention, a document support, and a method of using the document support, involves use of an elastic cord arranged in the shape of an endless loop, two elongated, tubular, high-friction spreaders defining bores through which the endless loop formed by the elastic cord slidably extends, and at least one squeeze-type spring clip slidably mounted on the elastic cord. The method of using the document support comprises the steps of: elastically expanding the elastic cord of the endless loop while the two spreaders are slid along the elastic cord to respectively place the spreaders on opposite edges of an object (such as a seat back) with the endless loop surrounding the stationary object and the spring clip positioned on a working side of the stationary object, and, thereafter, allowing the elastic cord to elastically contract onto the stationary object to mount the document support on the stationary object. Thereafter, documents are selectively attached to the at least one squeeze-type spring clip by a person positioned on the working side of the stationary object.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
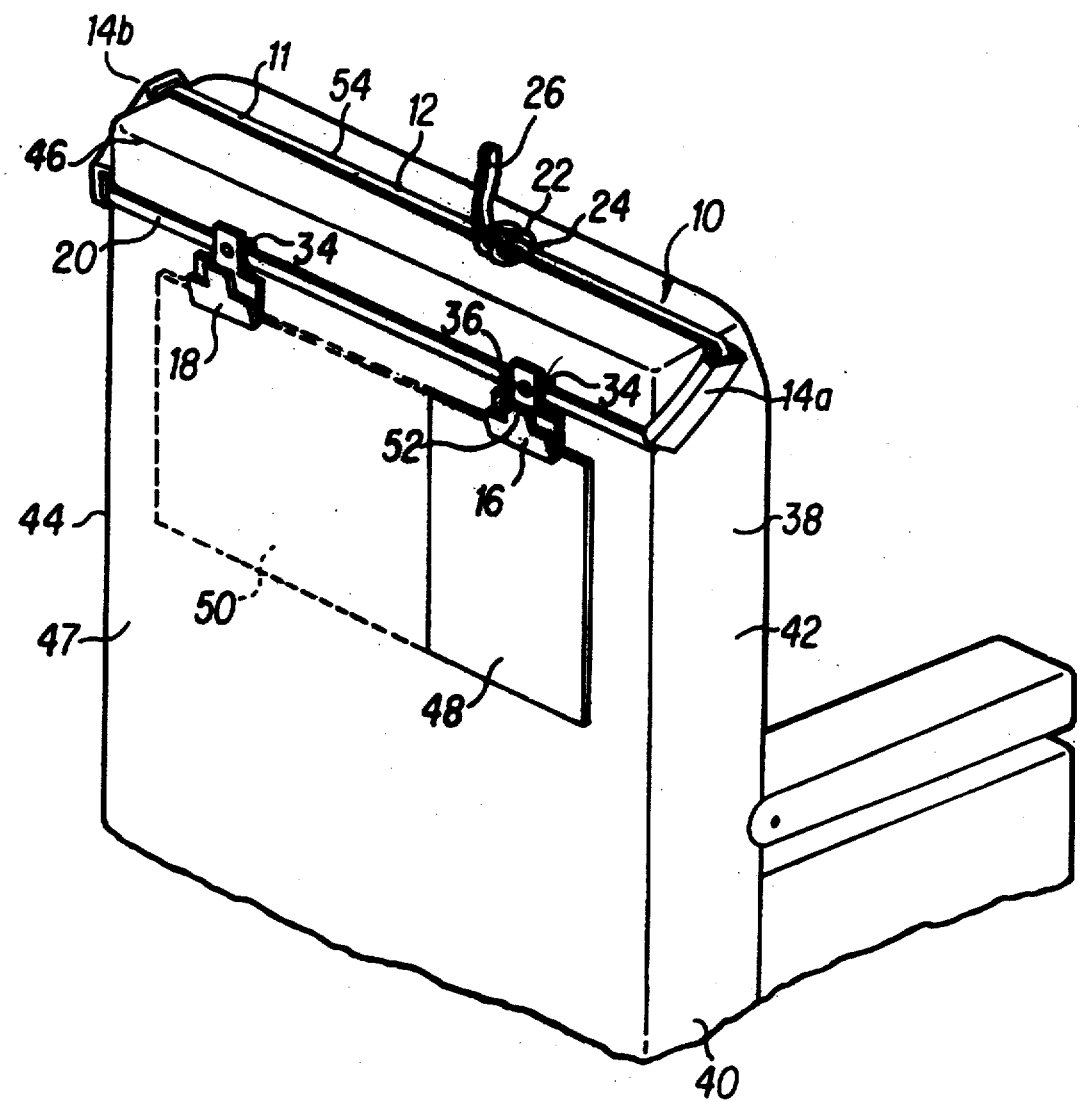
FIG. 1 is an isometric view of a document support of this invention mounted on a seat back of an airplane seat holding both a small document (solid lines) and a larger document (dashed lines)

A document support 10 comprises an elongated elastic cord 12 which is in the shape of an endless loop 11, two elongated, tubular, high-friction spreaders 14a, 14b, and a plurality of squeeze-type spring clips, or clamps, 16, 18, which are slidably mounted on a spand 20 of the endless loop 11 between the high-friction spreaders 14a and 14b.

The elastic cord 12 is formed into the endless loop by means of a buckle, or two-ring fastener, 22 which allows one to adjust the length of elastic cord 12 in the endless loop. In this regard, the two-ring fastener 22 is attached to one end 24 of the elastic cord while the other end 26 of the elastic cord is threaded through the two rings and then looped about one ring and pulled back through the other ring to slidably adjust the endless loop larger or smaller in a well-known manner.

Figure 3:
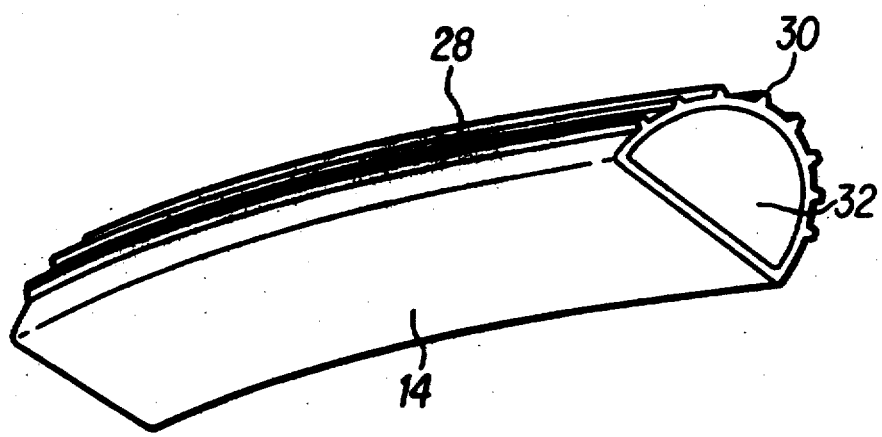
FIG. 3 is an enlarged, isometric view of a high-friction spreader of the document support of FIGS. 1 and 2.

The high-friction spreaders 14a, 14b are tubular in shape as is depicted in more detail in FIG. 3 and preferably have at least one surface 28 with protrusions 30 thereon for creating a high friction. In this respect, although the rigidity of the high-friction spreaders 14a and 14b is greater than that of the elastic cord, the high-friction spreaders 14a and 14b are not highly rigid members but rather are constructed of a resilient high-friction material, such as rubber or high-friction plastic. Each of the high-friction spreaders 14a and 14b defines a half-circle bore 32 therethrough through which the elastic cord 12 is threaded so that the high-friction spreaders 14a and 14b can be easily slid along the endless loop 11 formed by the elastic cord 12. Each high-friction spreader is between 2.5 inches and 4 inches long, preferably around 3 inches long.

Figure 2:
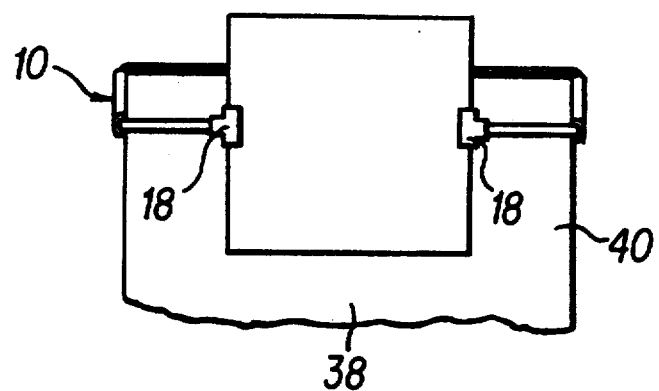
FIG. 2 is a rear view of an airplane seat back having a document support of this invention mounted thereon, with spring clips of the document support being rotated for supporting a, document at a different height than as is depicted FIG. 1.

The spring clips 16 and 18 can be any type of spring clamp that is actuated by squeezing. Each of these spring clips 16 and 18 has on a back side thereof a spring-clip mount 34 for defining an opening through which the endless loop formed by the elastic cord 12 extends. Thus, as in the case of the high-friction spreaders 14a and 14b, the spring clips 16 and 18 can be slid along the endless loop, although there is sufficient friction therebetween that the spring clips 16 tend to stay in the position to which they are manually slid. Further, each of these spring clips 16 and 18 is mounted to its respective spring-clip mount 34 by means of a rotatably pin 36, for example, so that the spring clips 16 and 18 can be rotated to face downwardly as shown in FIG. 1 or toward one another as shown in FIG. 2.

The document support 10 is constructed by attaching two rings of the two-ring fastener 22 to one end of the elastic cord 12 and then stringing the other end 26 through the bore 32 of the high-friction spreader 14a. The other end 26 is then threaded through the spring-clip mounts 34 of the spring clips 16 and 18 and through the bore 32 of the second high-friction spreader 14b. Finally, the other end 26 is passed through the two rings of the two-ring fastener 22, over one of the rings and back through the other ring, in a manner well-known in the prior art.

In use, the other end 26 is then pulled through the two-ring fastener 22 so as to form the elastic cord 12 into an endless loop which is smaller than a horizontal perimeter of a seat back 38, for example, of an airplane seat 40 on which the document support 10 is to be mounted. The elastic cord 12 forming the endless loop is then elastically stretched by gripping and separating the high-friction spreaders 14a and 14b, one with one hand and the other with the other hand. The high-friction spreaders 14a and 14b are placed on opposite edges 42 and 44 of the seat back 32 so as to enclose only a top rear corner 46 of the seat back 38. In this position, the user releases the high-friction spreaders 14a and 14b and the elastic cord 12 contracts the endless loop 11 so that the high-friction spreaders 14a and 14b are urged toward on another against the opposite edges 42 and 44 of the seat back 38 at the top, rear, corner 46. The high-friction spreaders 14a and 14b have sufficient friction with the opposite edges 42 and 44 that the document support 10 does not slide from the top, rear, corner 46 but rather stays in position as depicted in FIG. 1

It will be appreciated by those of ordinary skill in the art that when the document support 10 has been mounted on a seat back 38 as described above the spring clips 16 and 18 can be moved along the spand 20, positioned at a working side 47 of the seat back 38, from left to right so as to appropriately position documents 48 and/or 50 which are held there. As is obvious from the above description, the documents 48 and 50 can be attached to one or more of the spring clips 16 and 18 by squeezing handles 52 of the spring clips.

In addition, the spring clips 16 and 18 can be rotated about the hinge pins 36 so that the springs clips 16 and 18 can be clamped onto vertical edges of documents as depicted in FIG. 2 and the documents can be thereby moved to different vertical positions.

It will be appreciated by those of ordinary skill in the art when the document support is mounted as depicted in FIG. 1 it does not disturb an occupant of the airplane seat 40 because a spand 54 of the endless loop formed by the elastic cord 12 does not extend in front of the seat back 38.

Further, the document support 10 has the advantage of being adjustable to fit almost any size or shape seat back. Similarly, it can be sized and shaped to fit many other objects besides seat backs.

Also, once the document support 10 is mounted on an object, such as a seat back, the spring clips 16 and 18 can be moved along the spand 20 thereof, either left or right, and the spring clips can be rotated so as to adjust documents to various horizontal and vertical positions.

The positions and structures of the high-friction spreaders 14a and 14b allow users to easily mount the document support 10 and also serve to retain the document support at corners and on inclined surfaces on which it would not otherwise be mountable. The high-friction spreaders provide two rigid sections to the endless loop to prevent the loop from collapsing and sliding off the seat back.

The spreaders also allow the document support to be looped around a corner of a seat back rather than being looped around the entire seat back. The spreaders are flexible enough to form to the curvature of sides of the seat back but rigid enough to prevent collapse of the loop. As mentioned above, the spreaders have longitudinal ridges to increase friction and prevent the document support from slipping off of a seat back. The spreaders allow the elastic cord to pass therethrough so that, as the endless loop is elastically expanded by gripping the spreaders, the stress placed on the elastic cord is substantially equally distributed throughout the endless loop.

Another advantage of the document support 10 is that it can be "balled up" to a very small size to be transported in a briefcase or pocket.

While the invention has been particularly shown and described with reference to a preferred embodiment, it will be understood by those of ordinary skill in the art that various changes in form and detail may be made therein without departing from the spirit and scope of the invention. For example, different types of clamps than the spring clips 16 and 18 could be used in the document support. Also, a different type fastener, or buckle, than the two-ring fastener 22 could be used.

Further, the document support 10 need not be mounted on a seat back but can also be mounted anywhere where there are two perpendicular surfaces with edges and a need to hold papers for viewing. Examples include the top and front surfaces of a filing cabinet, any ordinary chair, an icebox door, a tool box, a computer monitor, and the like. But in any event, a document support of this invention can be easily attached to a top of a seat back in such a way that it does not cause damage to the seat or interfere with the person occupying the seat of the seat back.

The document support can be used for holding papers or magazines while a person is typing on a lap-top computer or otherwise performing work.

Although the document support disclosed herein only includes two spring clips, it would be possible to have as many spring clips as is desired. The invention actually only requires one spring clip.

The elastic cord can be a small-diameter shock cord or an elastic band of any type elastic material. The elastic cord holds all of the parts of the document support together and also provides a spring tension to retain the document support in place. The fastener 22 holds the two ends of the elastic cord together to form the endless loop and allows for infinite adjustment of the size of the endless loop to fit various-size seat backs and other objects.

Various style spring clips may be used to hold papers or magazines. Large-mouth, squeeze-type, clips are preferred. Various types of mounts for the clips could also be used.

The embodiments of the invention in which an exclusive property or privilege are claimed are defined as follows:

1. A document support comprising:
    an elastic cord arranged in the shape of an endless loop;
    two separate elongated, tubular, high-friction, spreaders, each defining a bore through which said endless loop formed by said elastic cord slidably extends, said spreaders having an outer surface of high friction and having a rigidity that is greater than that of said elastic cord;
    at least one squeeze-type spring clip including a mounting means for mounting said spring clip to a working span of said endless loop formed by said elastic cord;
    wherein, said elastic cord can be elastically expanded while said two spreaders are slid along said elastic cord to respectively place said spreaders on opposite edges of a stationary object (such as a seat back), with said endless loop surrounding said stationary object and said at least one squeeze-type spring clip positioned on a working side of the stationary object, and whereby the elastic cord can then be allowed to elastically contract onto said stationary object to mount said document support onto the stationary object, and whereby documents can be selectively attached to said at least one squeeze-type spring clip by a person positioned at the working side of said stationary object.

2. A document support as in claim 1 wherein said elastic cord includes a fastener in the endless loop for allowing adjustment of the size of said endless loop.

3. A document support as in claim 2 wherein there are a plurality of squeeze-type clips, with the mounting means of each defining a mounting opening through which said working spand of said elastic cord extends.

4. A document support as in claim 3 wherein said high-friction spreaders are each approximately between 2½ and 4 inches long.

5. A document support as in claim 4 wherein said spreaders have a half-circle, cross-sectional shape.

6. A document support as in claim 3 wherein said spreaders have a half-circle, cross-sectional shape.

7. A document support as in claim 1 wherein there are a plurality of squeeze-type clips, with the mounting means of each defining a mounting opening through which said working spand of said elastic cord extends.

8. A document support as in claim 7 wherein said plurality of squeeze-type spring clips are slidably mounted on said elastic cord.

9. A document support as in claim 1 wherein said mounting means is for slidably mounting said at least one spring clip on said working spand of said elastic cord.

10. A document support as in claim 1 wherein said high-friction spreaders are approximately between 2½ and 4 inches long.

11. A method of mounting a document on a seat back, or other object, comprising the steps of:
    forming an elastic cord into the shape of an endless loop;
    mounting two elongated, tubular, high-friction spreaders on said endless loop by stringing the elastic cord through bores of the high-friction spreaders;
    mounting at least one squeeze-type spring clip on a working span between said high-friction spreaders;
    gripping said spreaders and manipulating said high-friction spreaders to elastically expand said endless loop while allowing said elastic cord to slide through said spreaders;
    placing said high-friction spreaders at opposite edges of said seat back;
    releasing said high-friction spreaders to thereby allow said endless loop to contract said high-friction spreaders onto said edges and thereby retain said document support on said seat back;
    opening a mouth of said squeeze-type spring clip by squeezing said clip and inserting a document thereinto and then releasing said clip so that the clips grip said document, thereby mounting it on said seat back.

12. A method as in claim 11 wherein is included the further step of mounting a plurality of squeeze-type spring clips on said working span between said high-friction spreaders and wherein is also included the further step of attaching each of said squeeze-type spring clips to a single document.

13. A method as in claim 11 wherein the step of mounting said at least one squeeze-type spring clip on the working span includes the substep of mounting the clip to be slidable along the working span.

14. A method as in claim 11 wherein the step of mounting said at least one squeeze-type spring clip on the working span includes the substep of mounting the clip to be rotatable.

* * * * *